US006181453B1

(12) United States Patent
Darcie et al.

(10) Patent No.: US 6,181,453 B1
(45) Date of Patent: *Jan. 30, 2001

(54) METHOD AND APPARATUS FOR LASER PERFORMANCE ENHANCEMENT

(75) Inventors: Thomas Edward Darcie, Middletown; Patrick P. Iannone, Edison, both of NJ (US)

(73) Assignee: Lucent Technologies, Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/579,700

(22) Filed: Dec. 28, 1995

(51) Int. Cl.$^7$ .................................................. H04B 10/04
(52) U.S. Cl. .......................... 359/181; 359/161; 372/25
(58) Field of Search .................................. 359/180, 181, 359/187, 188, 157, 161; 372/25, 26–32, 38, 82

(56) References Cited

U.S. PATENT DOCUMENTS

| 4,868,894 | * | 9/1989 | Gilden et al. ......................... 455/617 |
| 5,040,184 | * | 8/1991 | Murray .................................. 372/38 |
| 5,267,071 | * | 11/1993 | Little et al. ........................... 359/154 |
| 5,343,324 | * | 8/1994 | Le et al. ............................... 359/184 |
| 5,377,035 | * | 12/1994 | Wang et al. ........................ 359/156 |
| 5,420,536 | * | 5/1995 | Faulkner et al. .................... 330/149 |
| 5,436,749 | * | 7/1995 | Pidgeon, Jr. ......................... 359/161 |
| 5,450,223 | * | 9/1995 | Wagner ................................ 359/124 |

* cited by examiner

Primary Examiner—Rafael Bacares

(57) ABSTRACT

A laser bias preconditioning methodology is provided, and an implementation of that methodology, that improves the carrier-to-noise ratio of analog CATV signals sent over an optical transmission medium. The bias preconditioning methodology causes the laser bias current to be continuously varied to track an envelope of the carrier signal.

9 Claims, 8 Drawing Sheets

US 6,181,453 B1

METHOD AND APPARATUS FOR LASER PERFORMANCE ENHANCEMENT

FIELD OF THE INVENTION

This application is related to a lightwave system and method for information transmission, and more particularly to performance improvement in a laser providing an input signal to such a system.

BACKGROUND OF THE INVENTION

The development of highly linear Distributed Feedback ("DFB") lasers has revolutionized the delivery of analog cable television ("CATV") signals. A single lightwave link can now replace a coaxial cable supertrunk containing 20 or more cascaded broadband RF amplifiers. In addition to reducing costs and improving reliability for conventional unidirectional broadcast systems, this technology is largely responsible for the rapid acceptance of hybrid fiber/coax (HFC) as the current domestic delivery system of choice for both analog broadcast and bidirectional digital switched services.

With the analog broadcast systems, however, the stringent carrier-to-noise ratio (CNR) and carrier-to-nonlinear-distortion ratio requirements for such systems limit the number of optical fibers which can be driven by a single DFB laser transmitter, and as well, the number of subscribers or end users that can be served by such a single laser. While it is possible to improve the CNR for a given laser output power by increasing the optical modulation depth per RF subcarrier (thereby providing greater signal power relative to a noise level), such an increase in modulation depth is usually accompanied by increasing levels of nonlinear distortion.

It will be understood that an increase in CNR, without a corresponding degradation in signal quality due to increased non-linear distortion, would enable a greater number of users to be served by such a lightwave system on a per-laser basis. Accordingly, an achievement of an increased CNR while maintaining non-linear distortion essentially fixed would provide an increase in relative efficiency for such a lightwave system.

SUMMARY OF INVENTION

In a lightwave transmission system, wherein a laser light source is modulated by an RF carrier signal and an output of such laser light source is optically linked to a receiver enabled to recover such a modulated signal, a method and means for varying a bias current for such a modulated laser light source so that the bias current tracks an envelope for that RF carrier signal. With the operation of the invention, a lesser average photo current is developed compared to prior art methodologies while achieving non-linear distortion levels no worse than such prior art methods, resulting in a reduction in photo-current dependent noise occurring in the receiver and, accordingly, a higher carrier-to-noise ratio is achieved without degradation of the received signal.

DETAILED DESCRIPTION

INTRODUCTION

Figure 1:
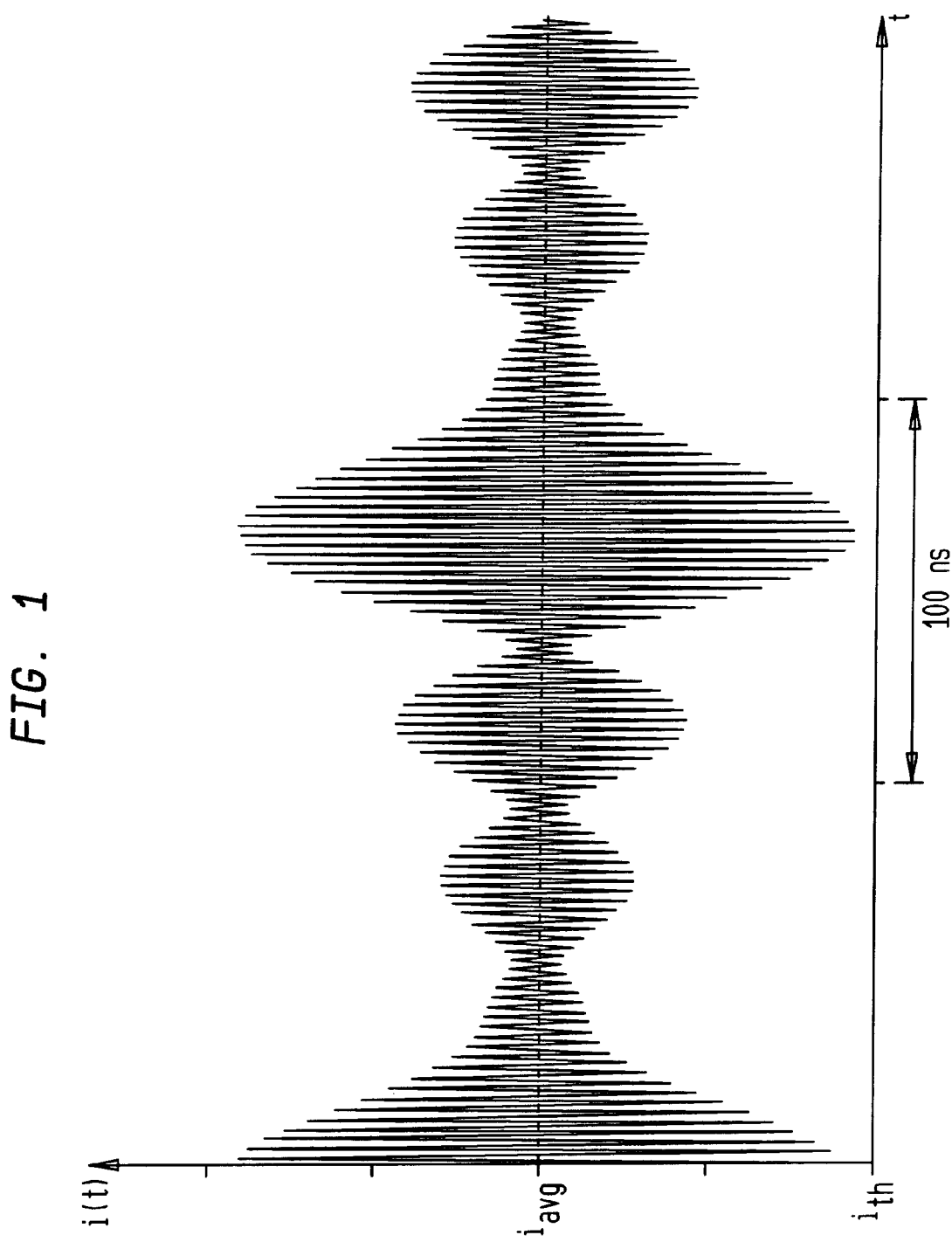
FIG. 1 illustrates in schematic form a typical CATV distribution system.

FIG. 1 shows schematically the major components of a typical CATV distribution system. In such a system, as shown in the figure, individual RF channels are collected at a head-end location 10, where they are multiplexed using an appropriate method and then carried over a trunking facility 20 to one or more distribution hubs 30. From the distribution hubs, a portion of the combined signal representing the collected individual programs are sent out over local feeder lines, ultimately to individual subscribers of the CATV system.

In earlier CATV systems, the trunking 20 connecting the head end with the distribution hubs was implemented using coaxial cable. Those coaxial cable trunks might contain up to 30 electronic amplifiers (depending on distance from head-end to distribution hub) with each such amplifier contributing distortion and noise to the signal being transported. As the linearity and power output of laser transmitters has continued to evolve, particularly with the development of the highly linear DFB laser, the replacement of that coaxial cable trunk with a fiber optic cable trunk has become feasible. With fiber optic trunking, such intermediate signal regeneration is generally not needed (at least for trunking lengths typical for CATV) and therefore fiber can offer significant improvements in quality and reliability.

At present the vast majority of consumer video equipment operates under the amplitude-modulated vestigial-sideband ("AM-VSB") format. That AM-VSB format is characterized by strict noise and distortion requirements, having a CNR requirement of 50–60 dB in order to provide "studio quality" transmission. And, with 60 or more channels separated by 6 MHz[1/], occupying a frequency band between 50 and 550 MHz, a large number of second order and third order distortion products are generated, which must be extremely small to maintain acceptable reception quality. As is known, the magnitude of these distortion products is related to the linearity of the laser source, which in turn is related to the modulation depth for the signal modulating the laser. It is also well known that the CNR for a lightwave system is proportional to the signal power from the laser, which is generally proportional to modulation depth. Thus, in the present art, an increase in modulation depth to achieve an increase in CNR will also cause an increase in distortion.

[1/] A U.S. standard (NTSC) analog color signal occupies a frequency band extending from essentially 0 Hz to 4.5 MHz.

In order to provide an improved CNR without an increase in distortion, a method is disclosed herein for laser bias pre-conditioning that improves the CNR by reducing the receiver noise for a given level of received RF power, but does not increase clipping induced nonlinear distortion (NLD). While it is known in the prior art to attempt to improve the CNR by adjusting the laser bias only during clipping events [see—L. Pophillat, "Optical modulation depth improvement in SCM lightwave systems using a dissymmetrization scheme," *IEEE Photonics Technology Letters*, 6, 750–753, 1994], the methodology disclosed herein achieves significantly improved results by continually varying the laser bias current such that the instantaneous composite modulation depth always approaches 1 (the maximum achievable modulation depth).

DESCRIPTION OF PREFERRED EMBODIMENT OF METHODOLOGY

The semiconductor laser transmitter in a typical analog lightwave CATV system is modulated directly with the sum of N RF channels. Even a laser with a perfectly linear L/I curve (above a threshold) will generate nonlinear distortion (NLD) if the sum of the RF amplitudes dips below the threshold. This clipping induced NLD sets a lower limit on the total carrier-to-NLD ratio (CNLDR) per channel generated in the laser, which in the case of large N (N>10) can be written as[2]

[2] See—A. A. M. Saleh, "Fundamental limit on number of channels in subcarrier-multiplexed lightwave CATV system," *Electronics Letters*, 25, 776–777, 1989; T. E. Darcie, "Subcarrier Multiplexing for Lightwave Networks and Video Distribution Systems," *Journal of Lightwave Technology*, 8, 1240–1248, 1990.

$$\frac{C}{NDL} \approx \sqrt{2\pi} \frac{1+6\mu^2}{\mu^3} e^{\frac{1}{2\mu^2}} \tag{1}$$

where $$\mu \equiv \sqrt{\frac{Nm^3}{2}} \tag{2}$$

and m is the optical modulation depth per RF carrier. Commercial 60-channel analog CATV systems currently operate with optical modulation depths of m≈0.04 per channel, in order to maintain a CNLDR per channel of approximately 65 dBc. Since these low modulation depths result in correspondingly low levels of received RF power per channel, the average received optical power must be quite high (approximately 0.5 mW) to meet the strict carrier-to-noise ratio requirement (CNR≧50 dBc) for these systems. Currently available linear DFB lasers have maximum output powers in the 10 dBm range, leaving 13 dB or less margin for transmission and splitting losses.

The post-receiver carrier-to-noise ratio for a single RF channel can be written as $$CNR = \frac{i_c^2}{\sigma_r^2 + \sigma_{shot}^2 + \sigma_{rin}^2} \tag{3}$$

where $i_c^2$ is the mean squared carrier current, $\sigma_r^2$ is the added receiver noise current variance, $\sigma_{shot}^2$ is the shot noise current variance, and $\sigma_{rin}^2$ is the relative intensity noise current variance. The added receiver noise term is a constant that includes thermal noise and the added noise associated with the receiver's amplifier stage(s). The shot noise and intensity noise terms scale with the average received photocurrent $i_{avg,r}$ and $i_{avg,r}^2$, respectively. The effects of these photocurrent-dependent noise contributions are particularly severe in analog systems, since the average received optical power is high and the optical modulation depth per channel is low. The bias pre-conditioning methodology of the invention dynamically adjusts the instantaneous laser bias point to track the RF envelope of the composite carrier signal, such that clipping-induced NLD is maintained at an acceptable level, but $i_{avg,r}$ is reduced. The electronic noise, which depends strongly on $i_{avg,r}$, is thereby reduced, resulting in increased CNR.

Figure 2:
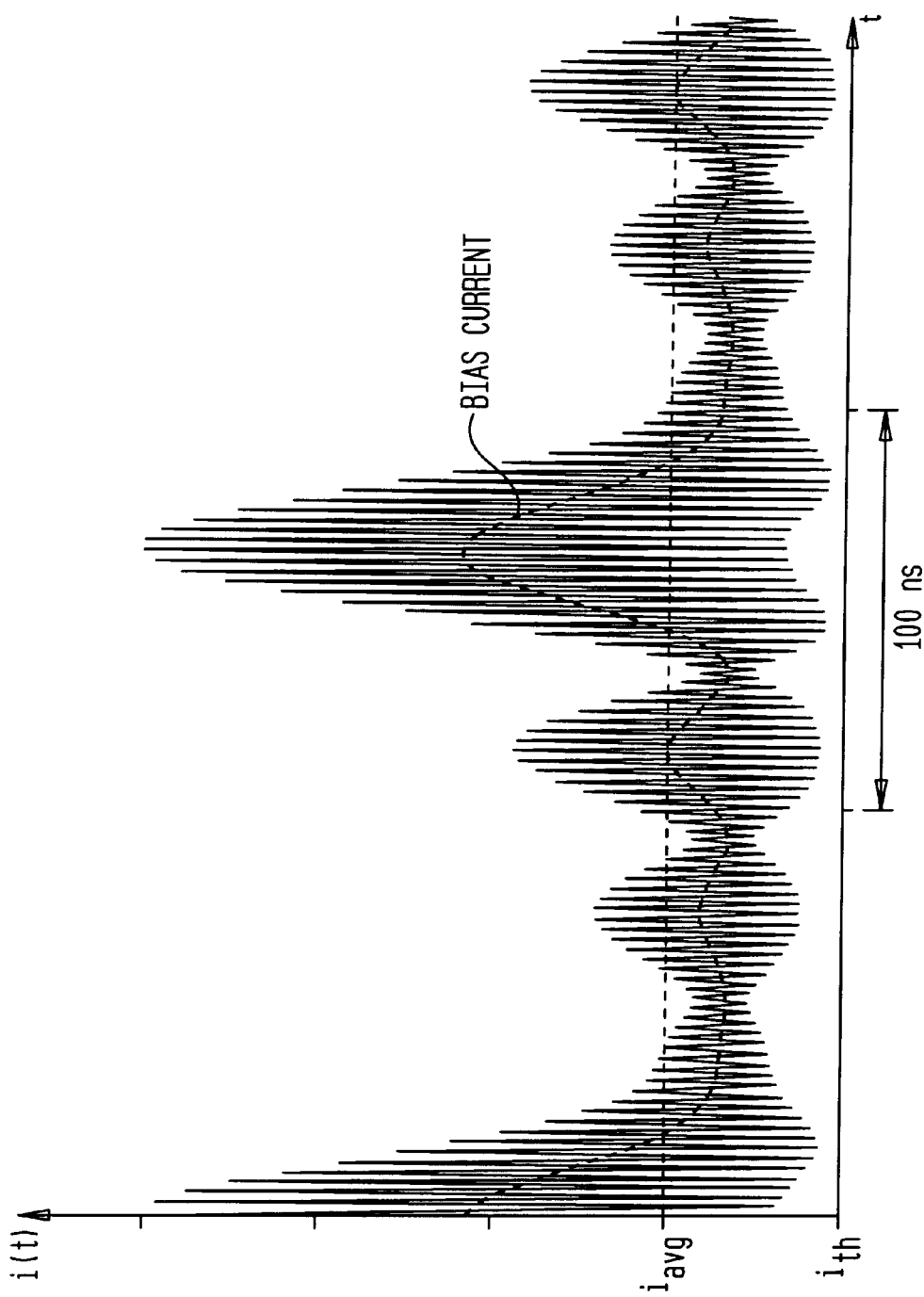
FIG. 2 depicts the laser drive current for a composite RF carrier using prior art biasing methods.
Figure 3:
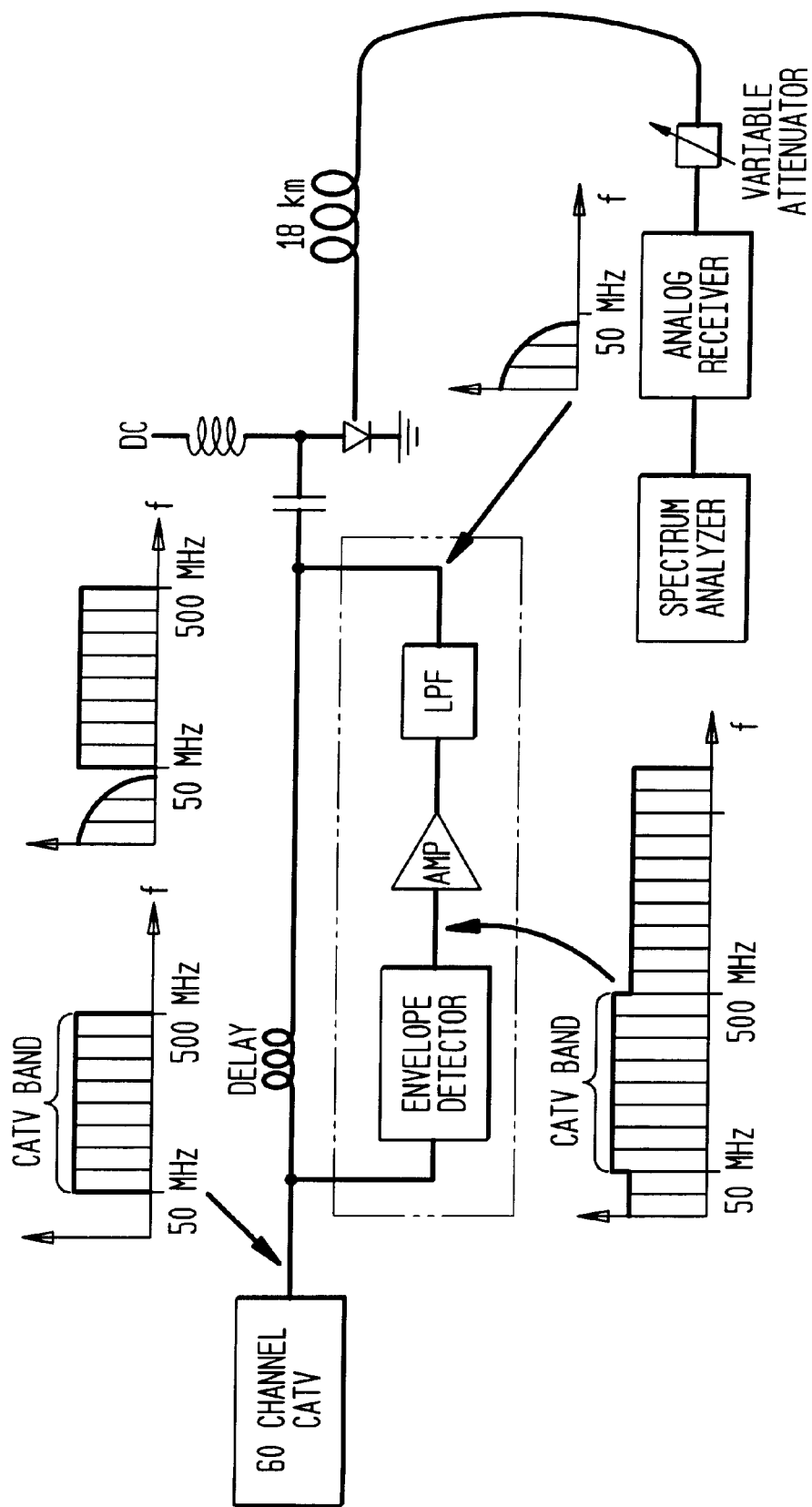
FIG. 3 depicts the laser drive current for a composite RF carrier using the bias pre-conditioning methodology of the invention.

A graphical depiction of the bias preconditioning method of the invention is shown in FIGS. 2 and 3. As a reference point, the laser drive current for a conventional laser-drive methodology is conceptually illustrated in FIG. 2. For simplicity, only five RF channels are shown in the figure—the actual illustrative channels ranging from 385.25 MHz to 409.25 MHz in steps of 6 MHz (corresponding to the carrier frequencies for channels 51 through 55 in the CATV band). The time-dependent drive current shown in FIG. 2 consists of the sum of the five equal-amplitude unmodulated RF carriers, with constant relative phases chosen to produce a composite RF signal with large peak-to-mean-envelope ratio. In order to avoid clipping, the modulation depth per channel is chosen to be m=0.2. The horizontal axis represents the laser threshold current level $i_{th}$. The time averaged laser bias current $i_{avg,l}$, represented by the dashed line, is equivalent to the instantaneous laser bias $i_{bias}$, which in turn is proportional to the average received photocurrent $i_{avg,r}$. During those intervals when the composite RF amplitude A(t) is relatively low (such as the interval: 30 ps<t<130 ps, in FIG. 2), the composite modulation depth M(t)≡A(t)/$(i_{bias}-i_{th})$ is small. This unwanted reduction in the composite modulation depth can be remedied by allowing the dc laser bias to vary with time such that the composite modulation depth is approximately unity for all t. This can be accomplished by causing the laser bias to track the envelope of the composite RF signal.

This result is graphically illustrated in FIG. 3 which shows the laser drive current for the bias pre-conditioning according to the method of the invention. The RF carriers are identical to those in FIG. 2, and thus the received RF power per channel will also be unchanged. The laser bias current $i_{bias}(t)$, denoted by the bold dashed line, consists of a dc term plus the low-pass filtered square of the composite amplitude. As can be seen, $i_{avg,l}$, shown as a thin dashed line, is substantially reduced relative to the conventional case depicted in FIG. 2. Since $i_{avg,r}$ is proportional to $i_{avg,l}$, the shot noise and RIN will be reduced for the bias pre-conditioning case, resulting in improved CNRs.

A. Implementation of Method of Invention

Figure 4:
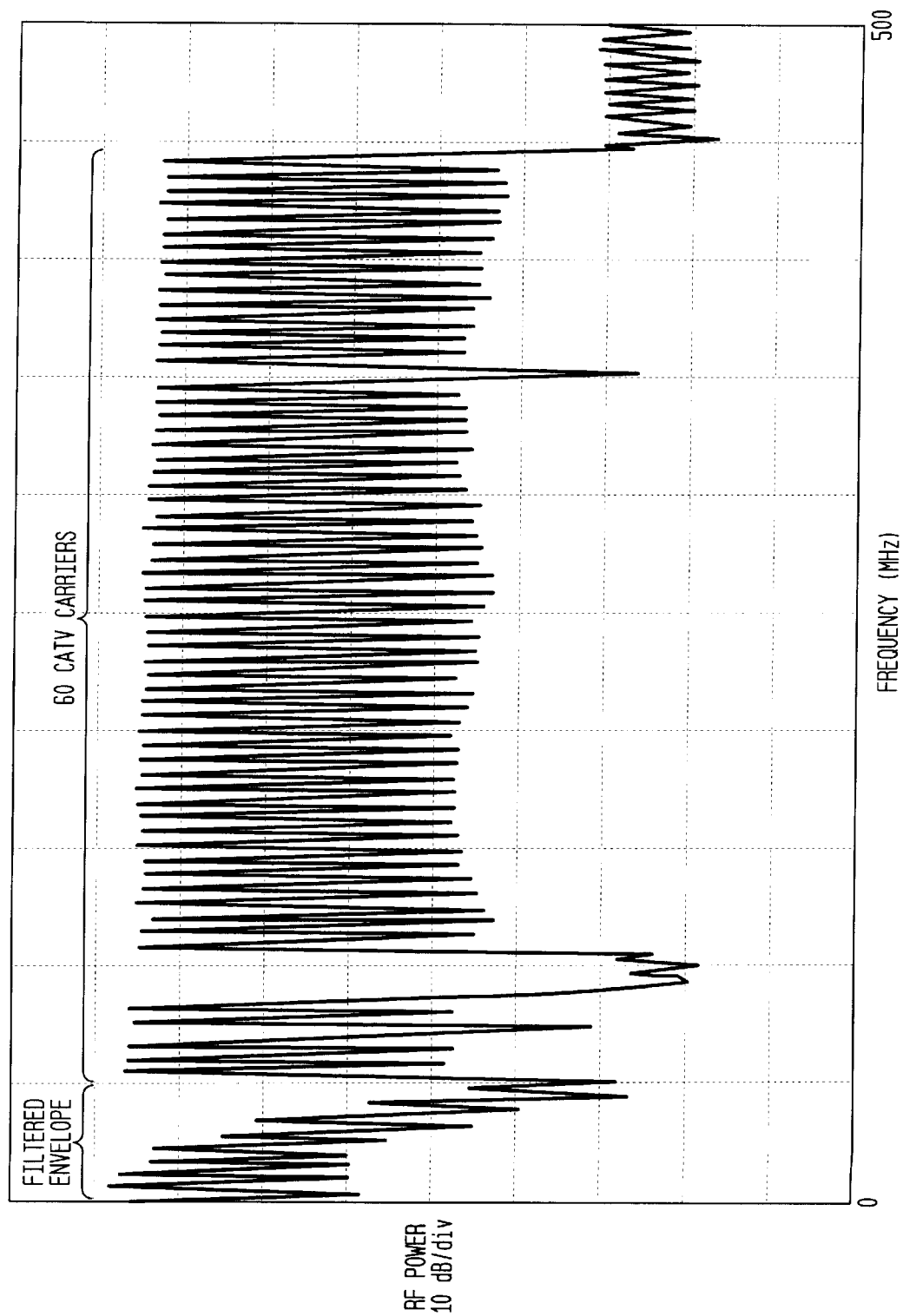
FIG. 4 shows an illustrative hardware implementation, in schematic form, of the bias pre-conditioning method of the invention.
Figure 5:
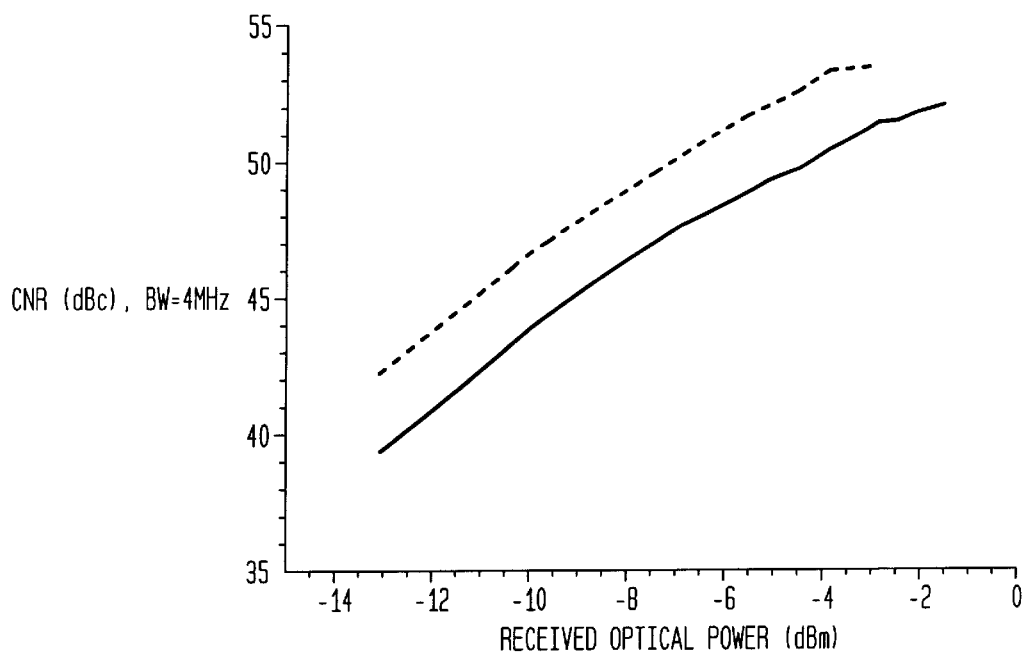
FIG. 5 shows a frequency spectrum representation of the composite RF drive signal with the method of the invention.

A hardware implementation of the method of the invention is illustrated schematically in FIG. 4. The RF signal shown as Input 100 to the transmission and reception system of the figure consists, illustratively, of 60 unmodulated carriers ranging in frequency from 55.25 MHz to 439.25 MHz, according to the NTSC standard. This signal is split passively by a signal splitter (not shown, but functionally depicted at junction 110), with a portion of that signal (preferably one-half) directed to the bias pre-conditioning circuit 120 (shown enclosed by dashed lines in the figure). In an illustrative embodiment, the bias preconditioning circuit includes a square-law device 130, which approximates an envelope detector[3], followed by a baseband amplifier 140 and a low pass filter 150. The low pass filter insures that the time-dependent bias does not include spectral components that will interfere with the received RF carriers. The output of the bias pre-conditioning circuit is combined with the RF carriers at junction 160 to form a time varying laser drive signal, such as shown in the frequency domain in FIG. 5. (In that figure, the filtered envelope occupies the 0–50 MHz band and the 60 CATV channels occupy the 55.25–439.25 MHz band.) The composite RF signal, in combination with the dc bias current (from DC source 170), drives a linear DFB laser transmitter 180, preferably of wavelength 1.3 μm. After transmission over a length[4/] of conventional single-mode fiber 190, the optical signal is detected with a commercial analog receiver 200.

[3/] It should be clear, however, that other means for envelop detection will also be encompassed by the invention.
[4/] In an exemplary embodiment of the invention, the optical fiber transmission length was chosen at 18 km, which exemplary embodiment provides the configuration for certain test results reported hereafter for the system and method of the invention.

Figure 6:
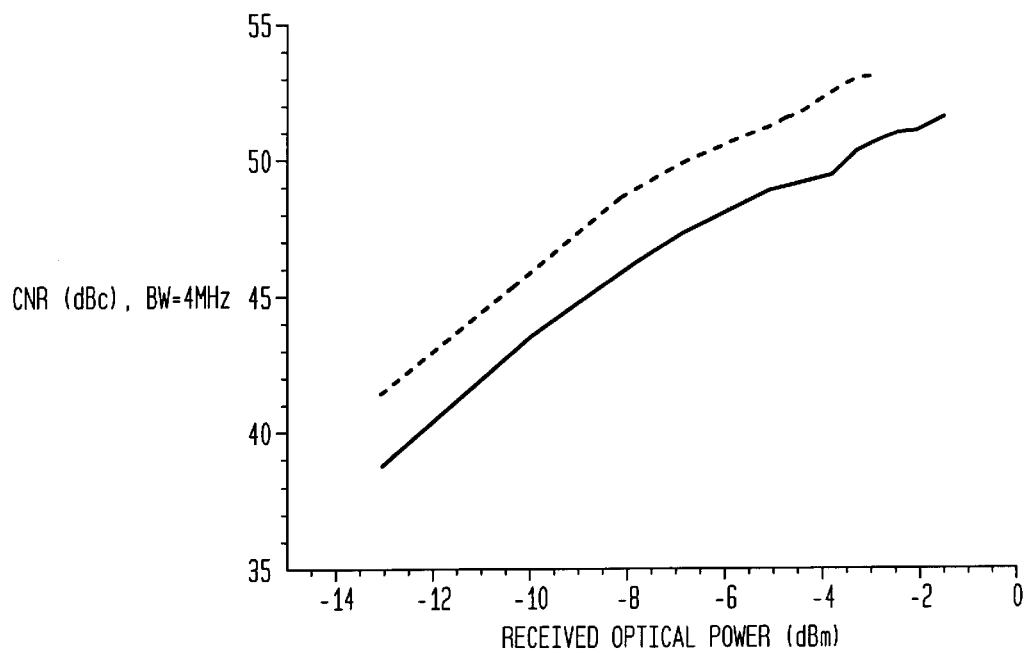
FIG. 6 shows the CNR as a function of received optical power for CATV channel 11, with and without the methodology of the invention applied.
Figure 7:
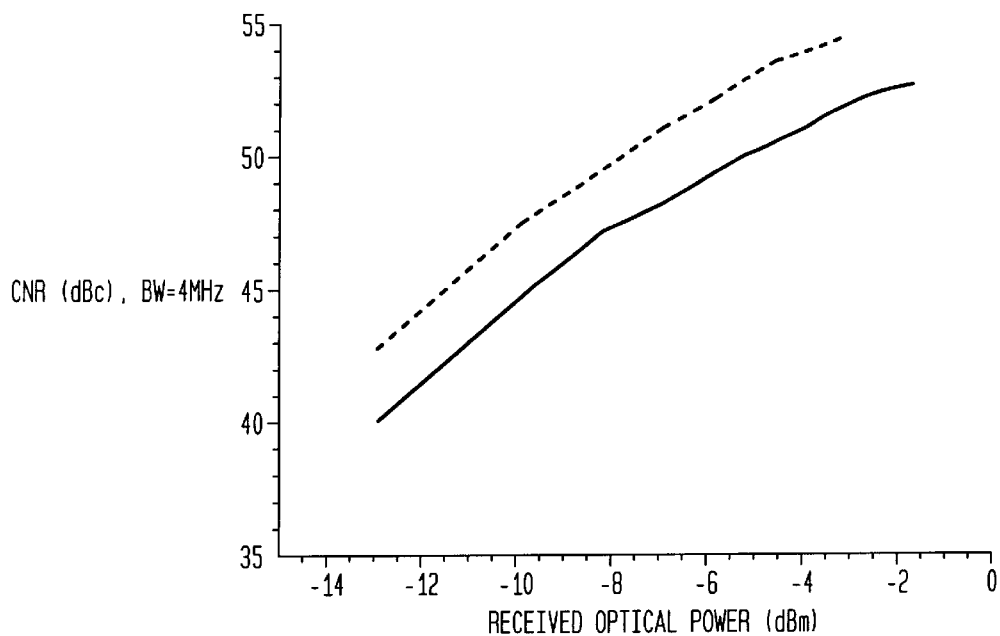
FIG. 7 shows the CNR as a function of received optical power for CATV channel 40, with and without the methodology of the invention applied.
Figure 8:
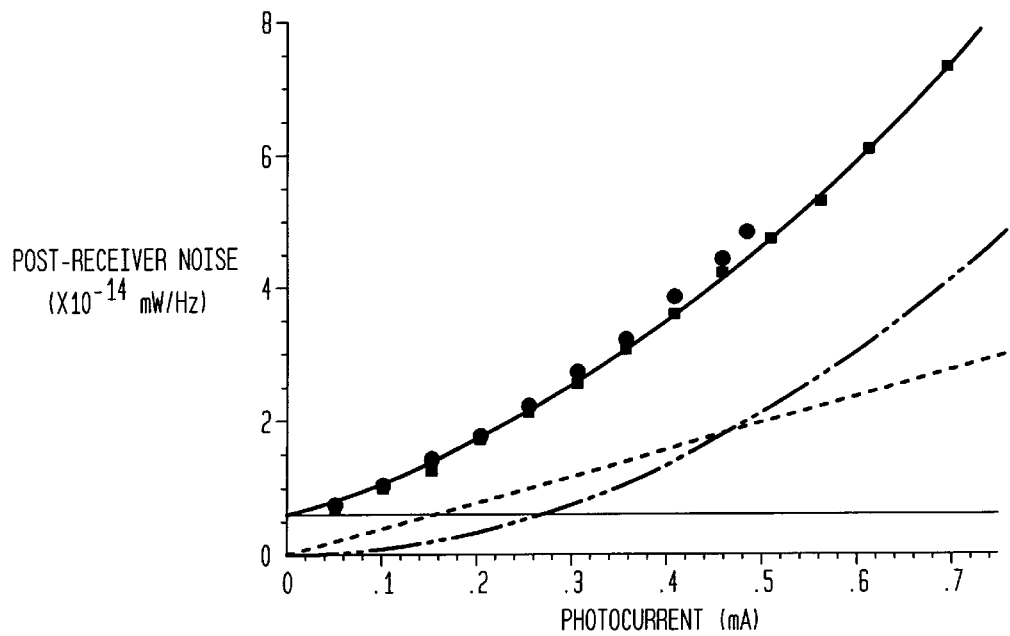
FIG. 8 shows the CNR as a function of received optical power for CATV channel 60, with and without the methodology of the invention applied.

In an exemplary embodiment using the bias pre-conditioning circuit described above, the amplitude of the filtered envelope signal was adjusted such that the composite second order (CSO) distortion level remained unchanged when the circuit was turned on—i.e., use of the bias pre-conditioning methodology resulted in no increase in the CSO distortion level. The CNR and the noise power were measured for channels 11 (199.25 MHz), 40 (319.25 MHz), and 60 (439.25 MHz), with and without the bias pre-conditioning circuit included in the transmission path. In FIGS. 6–8, the measured CNR as a function of received optical power is shown for each the three channels, respectively. The solid-line curve in each figure represents operation of the transmission system without the bias pre-conditioning circuit, and the dashed-line curve represents that system with bias pre-conditioning included. As can be seen from the figures, in each case, the CNR was improved by approximately 2 dB with the bias-preconditioning circuit included.

Figure 9:
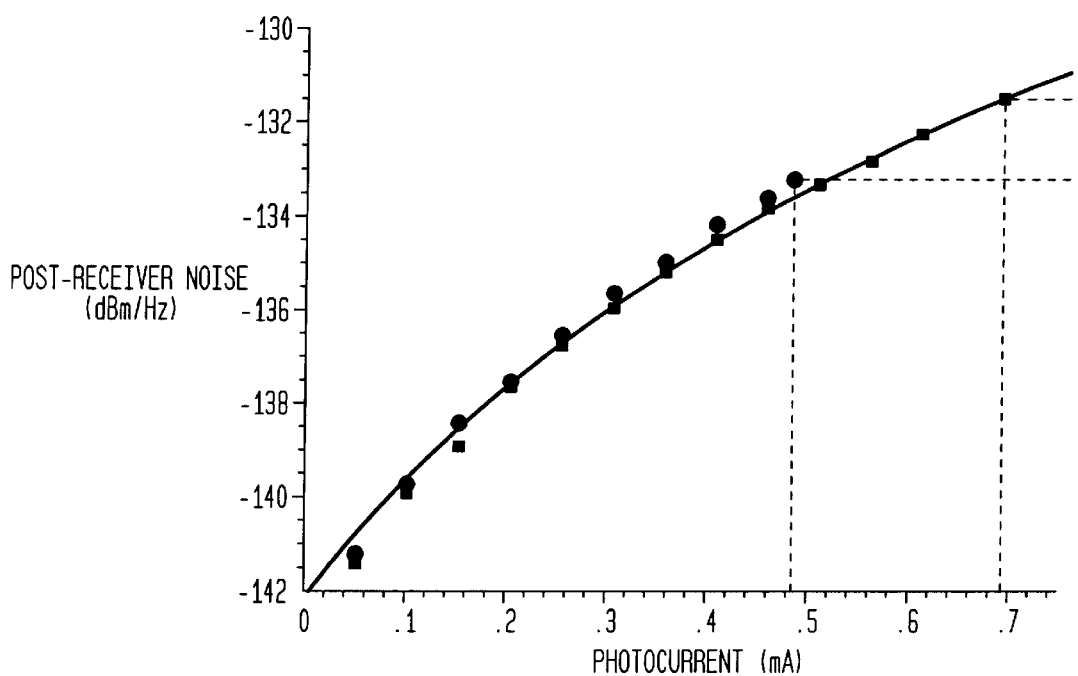
FIG. 9 shows post-receiver noise as a function of received photocurrent, with and without the methodology of the invention applied.
Figure 10:
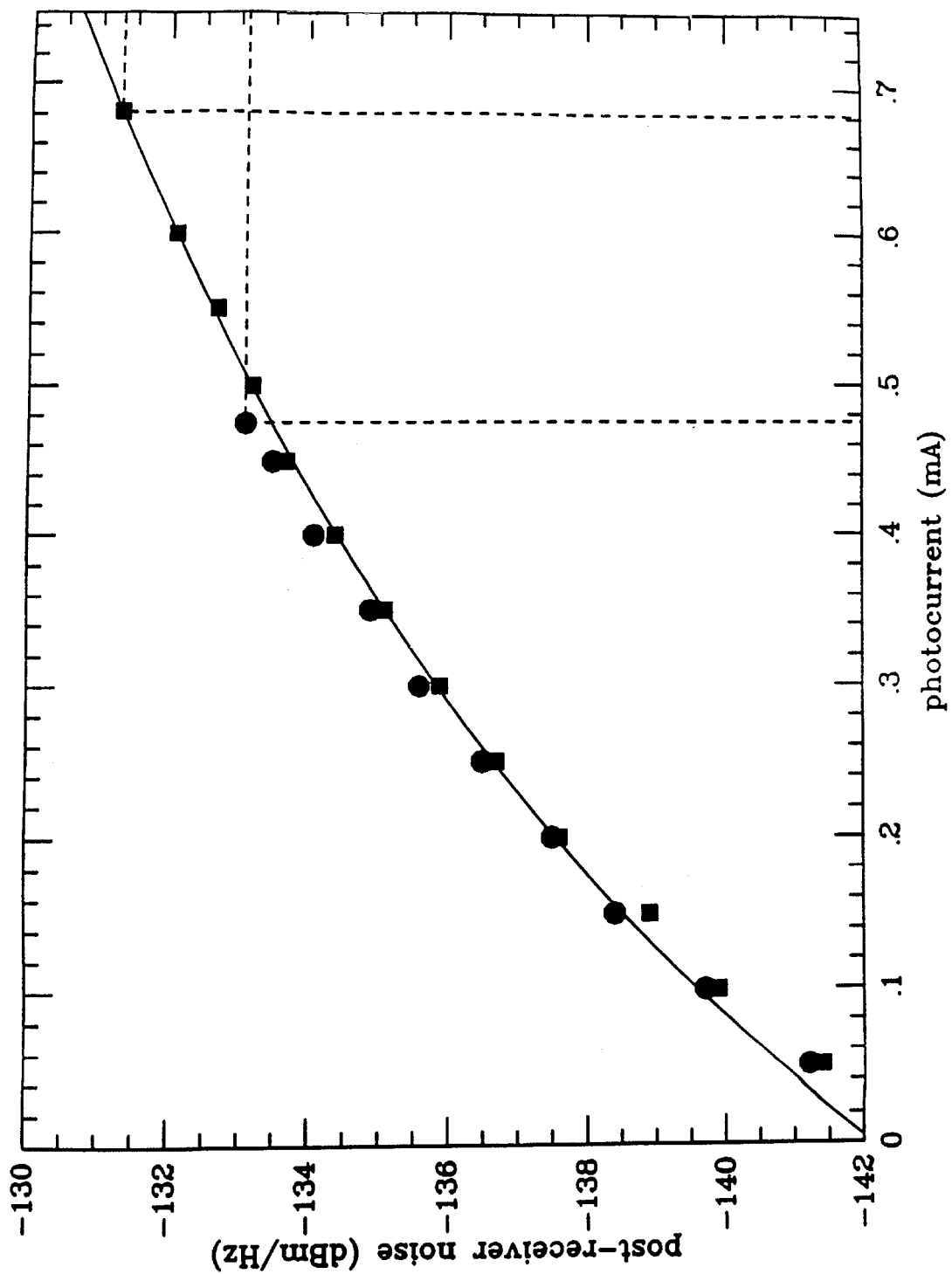
FIG. 10 shows post-receiver noise on a dB scale as a function of received photocurrent, with and without the methodology of the invention applied.

These results can usefully be depicted in terms of the photocurrent-dependent noise discussed in the previous section. FIG. 9 shows a plot of the post-receiver noise as a function of received photocurrent for channel 60. The received power with the bias pre-conditioning circuit on is plotted as darkened circles and the received power with the circuit off is plotted as darkened squares. As can be seen, the experimental data points agree well with the theoretical total noise curve, which is calculated as the sum of the constant added receiver noise term, shown as a solid line, the linear shot noise term, shown as a dashed line, and the parabolic RIN term, shown as a dot-dashed line. The only adjustable parameter used in the calculation is the RIN, due to double Rayleigh backscattering. The RIN value which gave the best fit (−151 dB/Hz) is in agreement with previously published measurements of multipath RIN for DFB lasers [see, T. E. Darcie, G. E. Bodeep, and A. M. Saleh, "Fiber-reflection-induced impairments in lightwave AM-VSB CATV systems," *Journal of lightwave Technology*, 9, 991–995, 1991]. FIG. 9 shows the same data plotted on a dB scale. The CNR enhancement produced by the bias pre-conditioning technique for high received powers is directly attributable to the reduction in average optical power. The maximum received power with the circuit on (uppermost circle) and the maximum received power with the circuit off (uppermost square) correspond to identical received RF power. Therefore, the 2 dB reduction in noise with the circuit on represents a 2 dB improvement in CNR.

It is to be noted that the achieved results for the exemplary embodiment described herein are believed to be less than optimal for the methodology of the invention. For example, as noted, the "envelope detector" used to implement the invention had a square-law response rather than an ideal diode response. The effect of using a non-ideal envelope detector is illustrated in FIG. 3. Rather than a flat lower limit to the current amplitude just above zero, the figure displays a varying lower limit with overemphasis during the highest peak and underemphasis during the smaller peaks. Additionally, the commercially-obtained low-pass filter used in that exemplary embodiment was not designed to have a sufficiently sharp cutoff above 50 MHz. With a more optimal choice of the electronic components for implementation of the inventive method, the inventors believe that one or more additional decibels of improvement in the CNR of a transmission system will be achieved by application of the bias pre-conditioning method of the invention.

CONCLUSION

A laser bias pre-conditioning methodology for application to lightwave transmission systems has been disclosed, which was shown, in an exemplary embodiment to increase the CNR in a 60-channel analog lightwave CATV system by at least 2–3 dB, while the CSO distortion remained unchanged. This increase in CNR permits an increase in the optical splitting ratio at the headend of a CATV system and therefore should lead to reduced costs associated with further sharing of the CO transmitter. As is well known, the highly-linear DFB transmitter in an analog lightwave system accounts for a large part of the cost of the lightwave link. Even a 3 dB improvement in CNR results in a doubling of the available received power, and thus a potential for sharing of the laser transmitter among twice the number of users.

Although the present embodiment of the invention has been described in detail, it should be understood that various changes, alterations and substitutions can be made therein without departing from the spirit and scope of the invention as defined by the appended claims.

We claim:

1. In a lightwave transmission system, wherein light emitted from a laser light source is modulated by an RF carrier signal, said modulated signal being referenced to a bias signal, and wherein said modulated laser light is optically linked to a receiver enabled to recover such a modulated signal, a method for improving a ratio of signal to noise in a received signal comprising the step of:
    converting said bias signal to a time varying bias signal for said laser light source so that an amplitude of said time varying bias signal is approximately proportional to an envelope for said RF carrier signal.

2. The lightwave transmission system of claim 1, wherein said laser light source is directly modulated by variation of a laser injection current.

3. The lightwave transmission system of claim 1, wherein said laser light source is externally modulated with optical modulation means separate from said laser light source.

4. An apparatus for varying a bias signal for a modulated laser light source comprising:
    means for generating an envelope for an RF carrier signal; and
    adjusting means, responsive to said envelope, for time varying said bias signal for said laser light source, wherein an amplitude of said bias signal is approximately proportional to said envelope for said RF carrier signal.

5. The apparatus of claim 4, wherein said adjusting means causes said bias current to be varied in approximate proportion to said envelope.

6. The apparatus of claim 4, wherein said generating means includes a detecting means which acts on a portion of said RF carrier signal.

7. The apparatus of claim 4, further comprising a means for amplification of a portion of an output signal from said envelope generation means.

8. The apparatus of claim 4, further comprising a filter means for removal of selected spectral components of an output of said envelope generation means.

9. A method for improving a signal to noise ratio in a lightwave transmission system without increasing distortion components in a received signal comprising the steps of:
   providing an RF carrier signal for transmission by said lightwave system;
   dividing said RF carrier signal into a first and a second portion and causing said first portion to traverse a bias pre-conditioning circuit, said bias pre-conditioning circuit being characterized as detecting an envelope of said RF carrier signal and providing a time varying output signal proportional to said envelope; and
   combining said bias pre-conditioning circuit time varying output signal with said second portion of said RF carrier signal, wherein said combined signal provides a time varying driving signal for a laser light source operating as an input means for said lightwave transmission system.

* * * * *